United States Patent
Bittner et al.

(10) Patent No.: US 8,112,079 B2
(45) Date of Patent: Feb. 7, 2012

(54) SYSTEM AND METHOD FOR PROVIDING CONGESTION CONTROL IN A COMMUNICATION SYSTEM UTILIZING SCHEDULED ACCESS COMMUNICATION CHANNELS

(75) Inventors: Richard J. Bittner, Schaumburg, IL (US); Ronald V. Gillis, Elburn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1065 days.

(21) Appl. No.: 11/924,266

(22) Filed: Oct. 25, 2007

(65) Prior Publication Data

US 2009/0111497 A1    Apr. 30, 2009

(51) Int. Cl.
*H04W 40/00*    (2009.01)

(52) U.S. Cl. ........ 455/428; 455/450; 455/453; 455/436; 455/442

(58) Field of Classification Search .............. 455/428, 455/450, 453, 436, 442
See application file for complete search history.

(56) References Cited

U.S. PATENT DOCUMENTS

| 6,097,700 | A | 8/2000 | Thornberg |
| 6,553,235 | B2 | 4/2003 | Bark |
| 7,769,391 | B2 * | 8/2010 | Andersson et al. ........... 455/453 |
| 2005/0164709 | A1 * | 7/2005 | Balasubramanian et al. 455/453 |
| 2006/0067257 | A1 | 3/2006 | Bonta |
| 2006/0087974 | A1 | 4/2006 | Ozer |
| 2006/0187840 | A1 | 8/2006 | Cuffaro |

* cited by examiner

*Primary Examiner* — Nghi Ly
(74) *Attorney, Agent, or Firm* — Terri Hughes Smith; Valerie M. Davis; Randi L. Karpinia

(57) ABSTRACT

A first communication channel is used by a communication unit for communicating with a base site. The first communication channel has an inbound link and an outbound link. The communication unit determines that congestion is present on the communication channel. The communication unit determines its transmission requirements and whether the first communication channel is capable of supporting its transmission requirements. If the first communication channel is not capable of supporting the transmission requirements of the communication unit, the communication unit locates a second communication channel capable of supporting its transmission requirements, and switches to the second communication channel to communicate with the base site.

20 Claims, 3 Drawing Sheets

SYSTEM AND METHOD FOR PROVIDING CONGESTION CONTROL IN A COMMUNICATION SYSTEM UTILIZING SCHEDULED ACCESS COMMUNICATION CHANNELS

TECHNICAL FIELD OF THE DISCLOSURE

This disclosure relates generally to data communications, and more particularly, to a system and method for providing congestion control in a communication system utilizing scheduled access communication channels.

BACKGROUND OF THE DISCLOSURE

Communication systems typically include a plurality of communication units, such as mobile or portable radio units, that are geographically distributed among various base sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Communication systems typically utilize one or more methods for detecting and compensating for network congestion. In current systems, congestion detection and control is generally performed by one or more components of the fixed network equipment, such as the base site or zone controller. This results in several drawbacks. First, it requires the fixed network equipment to devote significant processing time to monitoring the congestion on each communication channel, thus utilizing valuable resources. Additionally, the fixed network equipment, while capable of detecting the presence of congestion, typically has no knowledge of the specific amount of resources required by each particular communication unit at any given time. As a result, the fixed network equipment is not capable of adequately reconfiguring channel assignments to best utilize available channel resources when congestion is present.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

The present disclosure provides a system and method for providing congestion control in a scheduled access communication channel. In accordance with the present disclosure, each communication unit in a communication system is configured to individually monitor its associated communication channel. In particular, each communication unit monitors the channel reservation grants being transmitted on the outbound link of the associated communication channel to determine the volume of reservations being granted to other communication units associated with the same communication channel and/or the quality of the reservations (for example, in a scheduled access communication channel, whether the reserved time slots are assigned in a continuous block or dispersed in time). Based on this information, the communication unit assesses the expected transmission delays on the communication channel and determines whether the expected transmission delays exceed the quality of service (QoS) requirements for the applications supported by the communication unit. If the communication channel cannot support the communication unit's QoS requirements, the communication unit scans other available channels in its geographic area in an attempt to locate a suitable communication channel.

Figure 1:
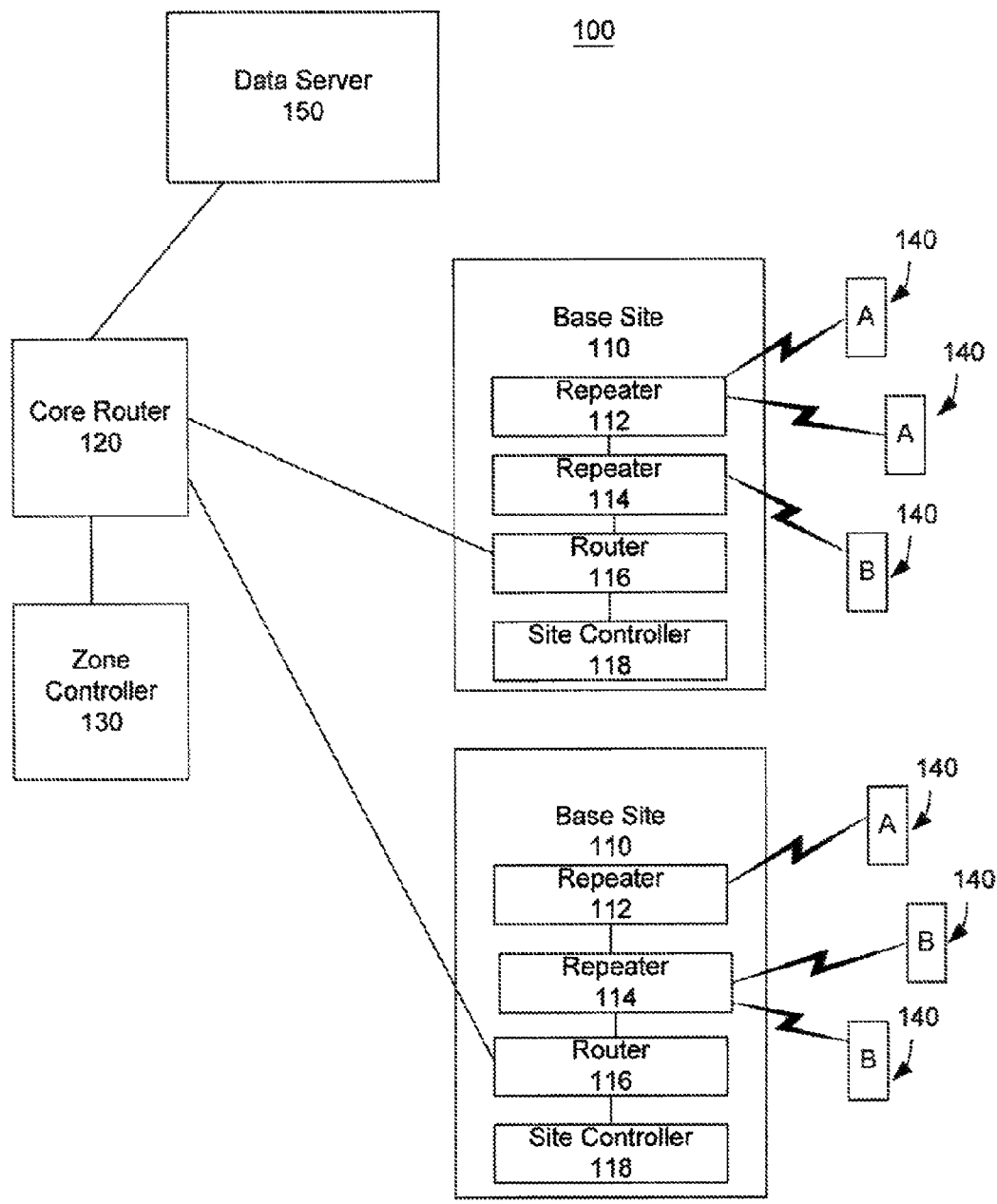
FIG. 1 shows one embodiment of a communication system in accordance with the present disclosure.

Let us now discuss the present disclosure in greater detail by referring to the figures below. FIG. 1 shows one embodiment of a single-zone in a communication system 100. The system 100 comprises a plurality of base sites 110 that are in communication with a core router 120. The core router 120 is also coupled to a zone controller 130. The zone controller 130 manages and assigns Internet Protocol (IP) multicast addresses for payload (voice, data, video, etc.) and control messages between and among the various base sites 110. The zone controller 130 is also responsible for assigning communication channels at the base sites 110.

As depicted in FIG. 1, each base site 110 is comprised of a plurality of repeaters 112, 114 that are coupled, for example via Ethernet, to an associated router 116, which is in turn coupled to the core router 120. Of course, while each base site 110 is illustrated as having two repeaters 112, 114, it is understood that any number of repeaters may be provided at each base site 110. Each router 116 is also coupled to a site controller 118. The site controller 118 is configured to handle communication channel assignments for its respective base site 110 in the event the base site 110 is unable to communicate with the zone controller 130 The core router 120 may also be further coupled to a data server 150.

The repeaters 112, 114 at each base site 110 communicate using wireless communication resources with communication units 140 within a specific coverage area. The wireless communication resources may comprise any type of communication resource such as, for example, RF technologies, including, but not limited to Frequency Division Multiple Access (FDMA), Time Division Multiple Access (TDMA), Code Division Multiple Access (CDMA), Orthogonal Frequency Division Multiple Access (OFDMA), and the like. Other wireless technologies, such as those now known or later to be developed and including, but not limited to, infrared, Bluetooth, electric field, electromagnetic, or electrostatic transmissions, may also offer suitable substitutes.

In one exemplary embodiment in accordance with the present disclosure, the wireless communication resources may also comprise multiple channels used for transmissions from the base sites 110 to communication units 140 (outbound link) and transmissions from the communication units 140 to the base sites 110 (inbound link). As would be understood by one skilled in the art, the nature of the channels will differ depending on the type of system being used. For example, in a FDMA system, each channel is comprised of a pair of frequency carriers. One frequency carrier of the pair is used for the outbound link while the other frequency carrier of the pair is used for the inbound link. In TDMA systems, however, each frequency carrier is divided into a plurality of time slots, with each time slot capable of being assigned to a different transmission.

The communication units 140 may be mobile or portable wireless radio units, cellular radio/telephones, video terminals, portable computers with wireless modems, or any other wireless devices. The communication units 140 may also be arranged into talkgroups having corresponding talkgroup identifications as known in the art. In FIG. 1, two separate talkgroups are illustrated, identified by labels "A" and "B." Of course, any number of talkgroups having corresponding talkgroup identifications may be established within the system 100.

Practitioners skilled in the art will appreciate that the system 100 may also include various other elements not shown in FIG. 1. For example, the communication system 100 may be connected to a number of additional content sources, such as the Internet or various Intranets. Although only two base sites 110 and one data server 150 are illustrated in FIG. 1, the system may include any number of base sites 110 and/or data servers 150. The system 100 may include remote sites configured to provide simulcast transmissions. The system 100 may also include multiple interconnected zones, each containing a zone controller 130, base sites 110, and data servers 150. The system 100 may also be linked to a public switched telephone network (PSTN), a paging network, a facsimile machine, or the like.

Figure 2:
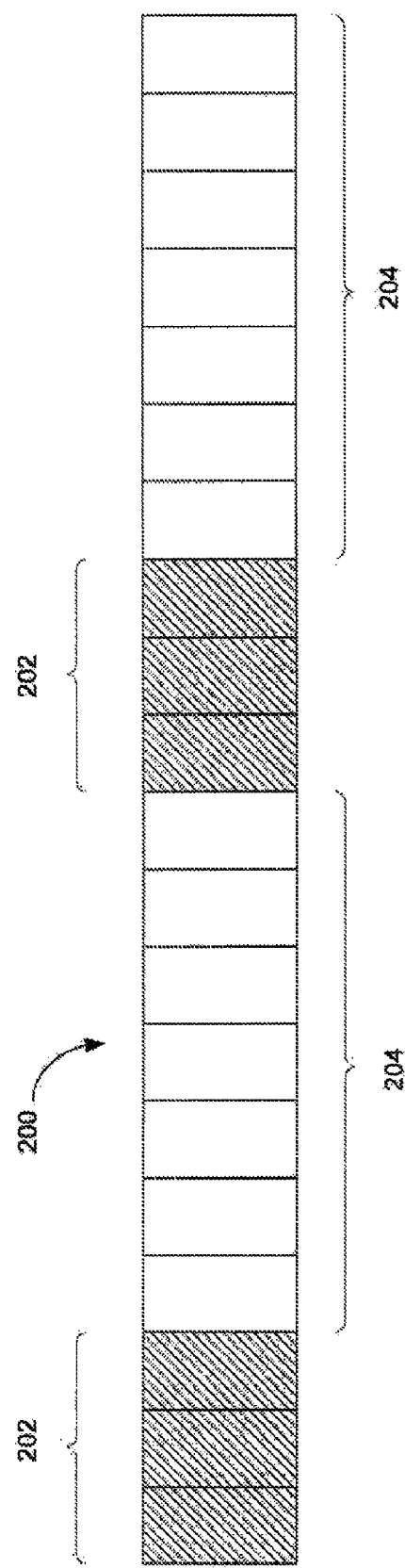
FIG. 2 shows one embodiment of a scheduled access communication scheme in accordance with the present disclosure.

FIG. 2 illustrates one exemplary embodiment of a scheduled access channel scheme that may be utilized for communications in the system of FIG. 1. In this embodiment, the scheduled access channel scheme is described in conjunction with the standards and protocols as set out in Telecommunications Industry Association (TIA) 902 WAI, although it should be understood that the present disclosure may also be applicable to systems using other channel schemes.

As shown in FIG. 2, each communication channel 200 is comprised of a plurality of time slots. A first set of slots 202 (also referred to herein as "control slots") is reserved for control signaling, such as channel reservation grants (in the case of outbound channel links), channel reservation requests (in the case of inbound channel links) and other signaling required for establishing communications. A second set of slots 204 (also referred to herein as "data slots") are reserved for transmission of call information (such as data, video, voice, etc.). In accordance with TIA 902 WIA standards, 3 out of every 10 slots are reserved as control slots, while the remaining 7 slots are reserved as data slots although the ratio of control slots to data slots may of course be altered.

In operation, when a communication unit 140 unit needs to initiate a data transmission, the communication unit 140 transmits a channel request message to a base site 110 using one or more control slots 202 on an inbound link of the communication channel 200. The fixed network equipment (such as the base site 110, the zone controller 130, or the like) processes the channel request message and reserves a set of data slots 204 for the data transmission. The availability of data slots 204 is generally determined based on the number and size of other data transmissions that have been requested on the same communication channel 200. Thus, when little or no other data transmissions are being sent on the same communication channel 200, data slots 204 may be available immediately and generally in a continuous block. However, when numerous other data transmission are being sent on the same communication channel 200, the reserved data slots 204 may only be available at a later time and/or may be dispersed in time. Once the appropriate data slots have been reserved, the base site 110 sends a channel grant message to the communication unit 140, via the control slots 202 on the outbound link of the communication channel 200, instructing the communication unit 140 to utilize the reserved data slots for the data transmission.

Figure 3:
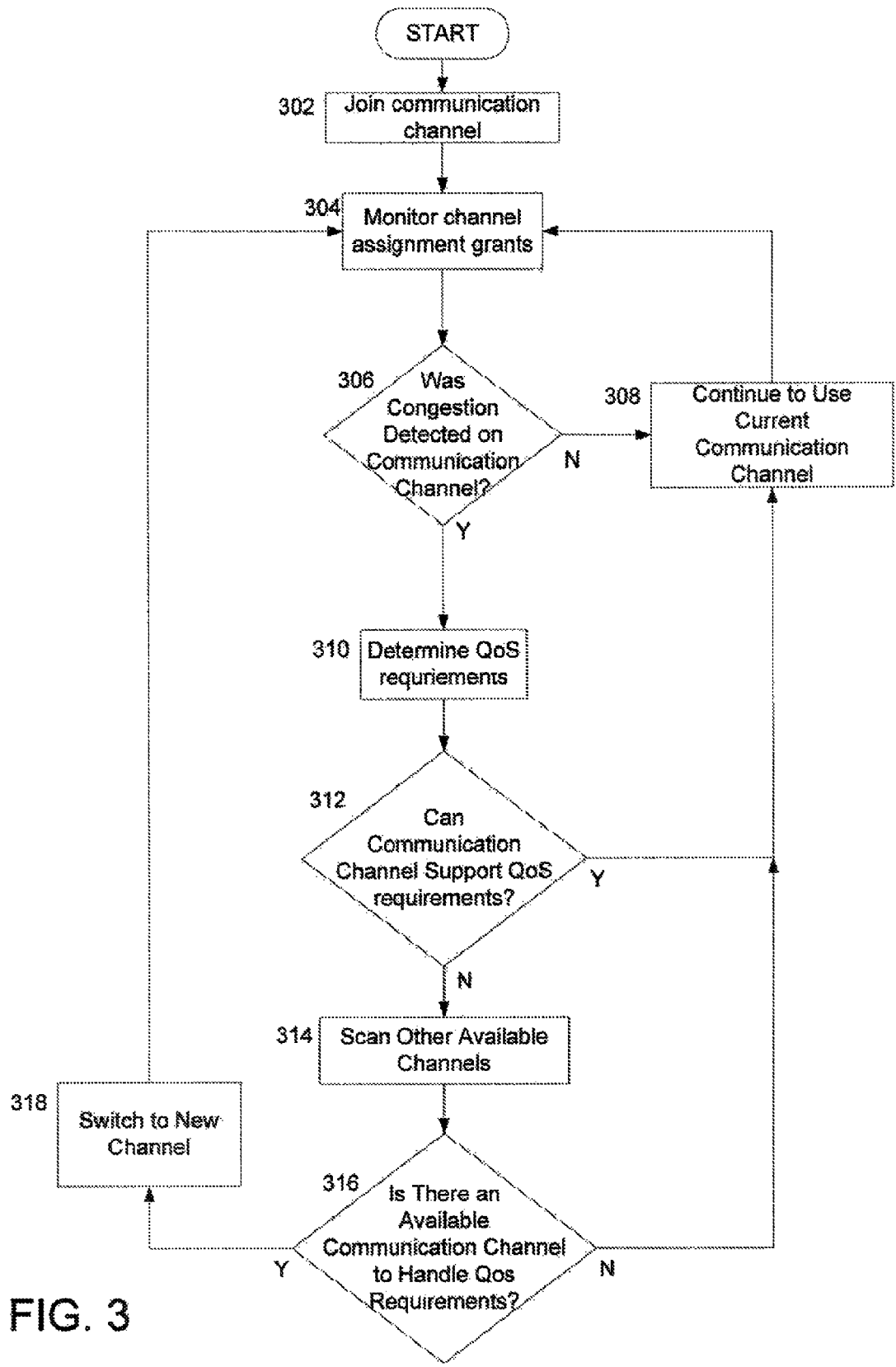
FIG. 3 shows one embodiment of a method for providing congestion control in the system of FIG. 1 in accordance with the present disclosure.

FIG. 3 illustrates one exemplary embodiment of a method for handling network congestion in a communication system using the scheduled access channel scheme illustrated in FIG. 2. In step 302, a communication unit 140 begins utilizing a communication channel (e.g., 200), using any one of various means that are well known in the art. For example, the communication unit 140 may be instructed to join a particular communication channel via control signaling broadcast on a control channel. The communication unit 140 may also be configured to individually select an available communication channel based on various criteria such as, for example, the signal strength of the available communication channels.

In step 304, the communication unit 140 monitors one or more characteristics of all the channel reservation grants being broadcast during the control slots of the outbound link of the communication channel, in order to infer expected transmission delays on the inbound link. For example, in one embodiment, the communication unit 140 may be configured to monitor the total number of channel reservation grants transmitted and/or the total number of data slots being reserved over a period of time in order to assess the volume of reservations granted to other communication units using the same communication channel. In another embodiment, the communication unit 140 may also be configured to monitor the quality of the channel reservation being granted. In one embodiment, the communication unit 140 may be configured to only monitor the quality of reservations for its own reservation requests, although the communication unit 140 may alternatively be configured to monitor the quality of reservations for all communication units utilizing the communication channel. The quality of a channel reservation may be determined by evaluating certain characteristics of the channel reservation grant such as, for example, when the reserved data slots are available (i.e., immediately or at a later time), or whether the reserved data slots are provided as a continuous block or dispersed in time. Of course, it should be understood that the communication unit 140 may be configured to monitor only one of these characteristics, or both of these characteristics simultaneously. Other types of characteristics may also be monitored, either in conjunction with, or instead of, those described above.

In step 306, the communication unit 140 determines whether there is congestion on the communication channel based on the monitored characteristics of the channel reservation grants. For example, the communication unit 140 may be configured to determine that there is congestion on the communication channel if the volume of reservations exceeds a predetermined threshold, if the quality of reservations falls below another predetermined threshold, or some combination of both. If other characteristics are monitored, other criteria may also be used to determine the presence of congestion.

If it is determined that there is no congestion, the communication unit continues to utilize the currently assigned communication channel in step 308 and the process returns to step 304. If it is determined that there is congestion, the communication unit 140 determines its QoS requirements in step 310. As used herein, the QoS requirements of the communication unit 140 are a measure of the performance characteristics (such as transmission quality, bandwidth requirements, availability of service, etc.) required for the applications being supported by the communication unit 140. For example, in the present disclosure, the pertinent QoS requirements may be the maximum allowable transmission delays for the applications being supported by the communication unit 140.

In step 312, the communication unit 140 determines whether the communication channel is capable of supporting the communication unit's QoS requirements in light of the present congestion. For example, the communication unit 140 may determine whether the expected delays resulting from the congestion (based on the volume of reservations to other communication units or the observed quality of reservations) exceed the maximum allowable transmission delays for the communication unit 140.

If the communication channel can support the QoS requirements of the communication unit 140, the process proceeds to step 308 and the communication unit continues to utilize the assigned communication channel. If the communication channel cannot support the QoS requirements, the process proceeds to step 314.

In step 314, the communication unit 140 attempts to locate a different available communication channel capable of supporting its QoS requirements. In one embodiment, the communication unit 140 may scan the available communication channels in its geographic area to determine the signal levels of each available communication channel. In another embodiment, the communication unit 140 may also be configured to monitor the control signaling, and more particularly the control reservation grants, being transmitted on the outbound link of each such available communication channel. For example, in one instance, once congestion is detected, the communication unit 140 may be configured to monitor the quality of reservations being granted on each of the available communication channels in its geographic area to determine the expected transmission delays on each such communication channel. In another instance, the communication unit 140 may also be configured to monitor the volume of channel reservations being granted on each available communication channel over a period of time. However, as would be understood by one of ordinary skill in the art, accurate and quick determination of the volume of granted channel reservations would generally require the communication unit 140 to monitor channel reservation grant on other communication channels on a continuous or periodic basis before congestion is actually detected. Additionally, although the communication unit 140 may be configured to monitor characteristics of the control channel grants being transmitted on each of the available communication channels in a geographic area, the communication unit 140 may alternatively be configured to only monitor communication channels having a signal strength above a certain level.

In step 316, the communication unit 140 determines whether any of the available communication channels have adequate resources to support its QoS requirements. This may be based on the signal level of each available communication channel, the quality of reservations for the communication channel, the volume of reservations, or any combination of the above. If there are no communication channels available that can support the communication unit's QoS requirements, the communication unit 140 continues to utilize the currently assigned communication channel in step 308. If there is a communication channel available that can support the communication unit's QoS requirements, the communication unit 140 will move to the new communication channel in step 318, and the process returns to step 304. Of course, if there are multiple communication channels available that can support the communication unit's QoS requirements, the communication unit 140 may also be configured to select the best of the available communication channels based on, for example, the signal level, the quality of reservations, the volume of reservations, or a combination thereof.

By means of the aforementioned disclosure, a system and method is provided that permits a communication unit 140 to individually assess the resources of a communication channel, and decide whether or not to switch to a different communication channel by comparing available communication channels based on their signal strength and predicted transmission delays. As a result, each communication unit 140 is capable of obtaining appropriate resources without involving the fixed network.

Further advantages and modifications of the above described system and method will readily occur to those skilled in the art. For example, although the present application has been described in conjunction with a TIA 902 WAI compliant channel access scheme, the present disclosure may be applied to any communication system utilizing a scheduled access communication scheme. It should also be understood that the present disclosure may be performed by each communication unit 140 on a periodic basis, on a continuous basis, or at any preset intervals.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for providing congestion control in a communication system, the method comprising, at a communication unit:

using a first communication channel for communicating with a base site, the first communication channel having an inbound link and an outbound link;

determining that congestion is present on the first communication channel by monitoring control signaling transmitted on the outbound link of the first communication channel;

determining transmission requirements for the communication unit;

determining whether the first communication channel is capable of supporting the transmission requirements of the communication unit; and when the first communication channel is not capable of supporting the transmission requirements of the communication unit:

locating a second communication channel capable of supporting the transmission requirements of the communication unit; and switching to the second communication channel to communicate with the base site.

2. The method of claim 1 further includes:

monitoring control signaling transmitted on the outbound link of the first communication channel for at least one of (a) a first set of information indicative of a volume of reservations granted to communication units associated with the first communication channel, and (b) a second set of information indicative of a quality of reservations being granted to communication units associated with the first communication channel; and determining that congestion is present on the communication channel based on at least one of the first and second sets of information.

3. The method of claim 2 wherein the first communication channel utilizes a scheduled access communication scheme, whereby each of the inbound and outbound links for the first communication channel includes a set of control slots reserved for transmitting control signaling and a set of data slots reserved for transmitting data information.

4. The method of claim 3 wherein monitoring control signaling transmitted on the outbound link includes monitoring channel reservation grants transmitted during one or more control slots on the outbound link.

5. The method of claim 4 wherein monitoring control signaling for the first set of information includes determining a number of data slots reserved on the first communication channel during a period of time.

6. The method of claim 4 wherein monitoring control signaling for the second set of information includes determining whether data slots are assigned as a continuous block of data slots or dispersed in time.

7. The method of claim 4 wherein the control signaling is monitored for each of the first set of information and the second set of information.

8. The method of claim 2 wherein determining transmission requirements for the communication unit includes determining the quality of service requirements for one or more applications supported by the communication unit.

9. The method of claim 8 wherein determining whether the first communication channel is capable of supporting the transmission requirements of the communication unit includes determining an expected transmission delay based on at least one of the first set of information or the second set of information, and determining whether the expected transmission delay exceeds a maximum allowable transmission delay for the one or more applications supported by the communication unit.

10. The method of claim 1 wherein locating the second communication channel includes:

determining at least one of (a) a signal strength for each of a plurality of communication channels and (b) an expected transmission delay for each of the plurality of communication channels; and selecting one of the plurality of communication channels based on at least one of the signal strength and the expected transmission delay.

11. A communication system comprising:

a base site; and a plurality of communication units capable of communicating with the base site via at least one of a plurality of communication channels, each communication channel having an inbound link and an outbound link;

wherein at least a first communication unit of the plurality of communication units is configured to monitor control signaling transmitted on the outbound link of a first communication channel being utilized by the first communication unit, determine whether congestion is present on the first communication channel based on the monitored control signaling, and determine whether the first communication channel is capable of supporting transmission requirements of the communication unit; and wherein, when the first communication channel is not capable of supporting the transmission requirements of the communication unit; the first communication unit is configured to locate a second communication channel capable of supporting the transmission requirements of the communication unit, and switch to the second communication channel to communicate with the base site.

12. The system of claim 11 wherein the communication unit is configured to monitor the control signaling for at least one of (a) a first set of information indicative of a volume of reservations granted to communication units associated with the first communication channel, and (b) a second set of information indicative of a quality of reservations being granted to communication units associated with the first communication channel.

13. The system of claim 12 wherein the first communication channel utilizes a scheduled access communication scheme, whereby each of the inbound and outbound links for the first communication channel includes a set of control slots reserved for transmitting the control signaling and a set of data slots reserved for transmitting data information.

14. The system of claim 13 wherein the communication unit is configured to monitor the first set of information by determining a number of data slots revered during a period of time.

15. The system of claim 13 wherein the communication unit is configured to monitor the second set of information by determining whether data slots are being assigned as a continuous block of data slots or dispersed in time.

16. The system of claim 13 wherein the transmission requirements are quality of service requirements for one or more applications supported by the communication unit.

17. The system of claim 13 wherein the communication unit is configured to determine whether the first communication channel is capable of supporting the transmission requirements of the communication unit by determining an expected transmission delay based on at least one of the first set of information or the second set of information, and determining whether the expected transmission delay exceeds a maximum allowable transmission delay for the one or more applications supported by the communication unit.

18. The system of claim 13 wherein the communication unit is configured to locate the second communication channel by determining at least one of (a) a signal strength for each of a plurality of communication channels and (b) an expected transmission delay for each of the plurality of communication channels; and selecting one of the plurality of communication channels based on at least one of the signal strength and expected transmission delay for each of the plurality of communication channels.

19. A communication system comprising:

means for communicating with a base site using a first communication channel, the first communication channel having an inbound link and an outbound link;

means for determining that congestion is present on the communication channel by monitoring control signaling transmitted on the outbound link of the communication channel;

means for determining transmission requirements for the communication unit;

means for determining whether the first communication channel is capable of supporting the transmission requirements of the communication unit; and when the first communication channel is not capable of supporting the transmission requirements of the communication unit:

means for locating a second communication channel capable of supporting the transmission requirements of the communication unit; and means for switching to the second communication channel to communicate with the base site.

20. The system of claim 19 including means for monitoring control signaling transmitted on the outbound link of the communication channel for at least one of (a) a first set of information indicative of a volume of reservations granted to communication units associated with the first communication channel, and (b) a second set of information indicative of a quality of reservations being granted to communication units associated with the first communication channel; and means for determining that congestion is present on the communication channel based on at least one of the first and second sets of information.

* * * * *

UNITED STATES PATENT AND TRADEMARK OFFICE
CERTIFICATE OF CORRECTION

| | |
|---|---|
| PATENT NO. | : 8,112,079 B2 |
| APPLICATION NO. | : 11/924266 |
| DATED | : February 7, 2012 |
| INVENTOR(S) | : Richard J. Bitter |

Page 1 of 1

It is certified that error appears in the above-identified patent and that said Letters Patent is hereby corrected as shown below:

ON THE COVER PAGE

1. At the top of page, beneath line (12), delete "Bittner et al." and insert therefor --Bitter et al.--.

2. At (75) Inventors:, after Richard J., delete "Bittner" and insert therefor --Bitter--.

Signed and Sealed this
Eleventh Day of September, 2012

David J. Kappos
*Director of the United States Patent and Trademark Office*